(12) United States Patent
Boeckmann et al.

(10) Patent No.: US 6,597,157 B1
(45) Date of Patent: Jul. 22, 2003

(54) PARALLEL PHASED SWITCH CONTROL

(75) Inventors: Eduard F. Boeckmann, Huntsville, AL (US); Stewart Carlton, Harvest, AL (US)

(73) Assignee: 3DLabs, Inc., Ltd, Hamilton (BM)

( * ) Notice: Subject to any disclaimer, the term of this patent is extended or adjusted under 35 U.S.C. 154(b) by 0 days.

(21) Appl. No.: 10/164,172

(22) Filed: Jun. 5, 2002

Related U.S. Application Data (60) Provisional application No. 60/308,086, filed on Jul. 25, 2001.

(51) Int. Cl.[7] .............................................. G05F 1/618
(52) U.S. Cl. ........................................ 323/242; 323/282
(58) Field of Search ................................. 323/242, 243, 323/282, 284

(56) References Cited

U.S. PATENT DOCUMENTS

| | | | |
|---|---|---|---|
| 5,394,524 A | | 2/1995 | DiNicola et al. ............ 395/163 |
| 5,481,178 A | * | 1/1996 | Wilcox et al. ............... 323/287 |
| 5,557,734 A | | 9/1996 | Wilson ........................ 395/162 |
| 5,627,460 A | * | 5/1997 | Bazinet et al. ............... 323/288 |
| 5,757,385 A | | 5/1998 | Narayanaswami et al. .. 345/505 |
| 5,821,950 A | | 10/1998 | Rentschler et al. ......... 345/505 |
| 5,841,444 A | | 11/1998 | Mun et al. .................. 345/506 |
| 6,057,675 A | * | 5/2000 | Tateishi ....................... 323/283 |
| 6,362,608 B1 | * | 3/2002 | Ashburn et al. ............. 323/272 |
| 6,377,032 B1 | * | 4/2002 | Andruzzi et al. ............ 323/224 |
| 6,465,993 B1 | * | 10/2002 | Clarkin et al. .............. 323/272 |

FOREIGN PATENT DOCUMENTS

WO     WO 97/21192     6/1997     ............. G06T/1/20

* cited by examiner

*Primary Examiner*—Bao Q. Vu
(74) *Attorney, Agent, or Firm*—Arnall Golden Gregory LLP (57) ABSTRACT

An integrated circuit controller for power conversion systems that provides for the control of parallel phased semiconductor switches without the need for separate filter inductors for each switch. The controller derives two phased clock signals from a source clock, generates ramp signals, modulates ramp signals, and outputs phased gate drive signals to control parallel phased switches.

21 Claims, 12 Drawing Sheets

PARALLEL PHASED SWITCH CONTROL

CROSS REFERENCE TO RELATED APPLICATION

This application claims the benefit of U.S. Provisional Patent Application Ser. No. 60/308,086, filed on Jul. 25, 2001, which is incorporated herein by reference.

BACKGROUND OF THE INVENTION

1. Field of the Invention

The invention generally relates to power converters and, more particularly, the invention relates to control circuits for various types of converters with parallel phased switches.

2. Description of the Related Art

Integrated circuits and other circuit elements within electronic devices commonly require an input voltage that is smaller than that supplied by a regulated D.C. power source. For example, an integrated circuit within a computer system may require a powering voltage of about 2.5 volts D.C. from a standard 3.3 volt regulated D.C. source. To that end, voltage regulators have been developed that reduce an input D.C. voltage to a preselected, lower voltage.

Many such prior art regulators, such as linear converters, have a relatively low efficiency (i.e., between about fifty and sixty five percent) when used in high current applications. Accordingly, when used in high current applications, linear converters typically require relatively large heat sinks to dissipate a large amount of heat produced by the voltage reduction process. This heat loss necessarily increases the operating cost of such converters. Moreover, the requirement of a heat sink increases the size and manufacturing cost of each converter.

The related art has responded to this efficiency problem by providing switching voltage converters, called "buck converters," that dissipate minimal heat in high current (as well as low current) applications. Buck converters typically utilize an inductor and a switch that cooperate to reduce the input voltage to a preselected output voltage.

For example, when a 3.3 volt input is reduced to a 1.8 volt output, the high side switch of a buck converter must be of very low resistance when in the on-state and may have to operate at a high duty cycle due to the small difference in input to output voltages. In response to such case, a buck converter with paralleled and phased high side switches was developed.

Other prior art, such as linear regulators, have too low an efficiency (i.e., about 50%) to be used for more than a few amps of output current without heavy losses and a need for external heat sinking, thereby increasing the size and cost of the converter.

Buck converters have been developed that operate in a high frequency switching mode in an attempt to minimize loss. The buck converter is usually at least 65% to 95% efficient. Buck converters usually incorporate at least one switch (e.g., MOSFET or transistor), one coil, and a filter capacitor on the output for noise reduction and good transient response. These components are usually controlled by an integrated circuit that sets the duty cycle of the switch according to load demands as sensed by a feed-back sense line connected from the load back to the integrated circuit controller. Thus the controller compensates for both load and input line variations to produce a constant output.

As load current demands have raised it becomes difficult to use only one switch because of limitations of the on-state resistance of the switch and its heat dissipating capability at high duty cycles. One proposed solution to this problem has been to put more switches in parallel, and another is to use more voltage reduction sections in a phased switching sequence called a "multiphase converter." Both of these solutions have serious drawbacks. Simply paralleling transistors is not a good solution because the transistors often do not share current equally, and the configuration produces a constantly heavy load on the gate driver circuit. The "multiphase" converters require an additional inductor with each parallel switch, which increases the cost of the manufacturing the converter.

The prior art of the integrated control circuits for the buck converter can be classified according to the following main general types, in order of their chronological development: hysteretic mode, voltage mode, peak current mode, average current mode, "v-squared" mode, and "multiphase" control. There are many other control techniques that have been used from time-to-time, however, the ones mentioned above are the ones in most general use today.

Of these control methods there is a further classification as "synchronous" or non-synchronous. The term synchronous, for buck converters, refers to the use of a low-side switch from the input of the inductor to common, which is turned on whenever the high-side switch is turned off so that continuous current can be maintained through the inductor. The integrated circuit control for a synchronous circuit turns on the low-side switch at all times when the high-side switch is turned off. "High-side" refers to the switch connected directly between the input power source and the input to the inductor while the low-side switch refers to the switch connected from the input of the inductor to common or "ground."

The non-synchronous type of control circuit does not provide a drive signal for the low side switch, depending instead on an external diode connected from common to the inductor input to maintain continuous current flow. Compensation is usually provided by resistive and capacitive elements connected externally to the controller IC (if the integrated circuit controller requires compensation for the gain-phase characteristics of the feedback loop of the converter).

One example of a controller is the pulse width modulator (PWM) controller, which usually provides the following functions: An error amplifier, which senses the converter output or load variations and amplifies the difference relative to a fixed reference voltage for further processing by the controller; A voltage reference provided either internally to the controller or externally programmed through a digital to analog converter (DAC) which is internal to the controller; Logic and/or analog circuitry for determining whether an external high-side switch should be turned on or off depending on the signal from the error amplifier; Gate drive circuitry to provide PWM pulses to the external high and low-side switches; A clock circuit and a ramp generator for comparing the error signal to the instantaneous value of the ramp voltage to generate the PWM gate drive signals; Various sense and logic circuits for protective functions such as detecting a fault condition (short circuit, over-voltage on input or output, under-voltage on input, over-current, etc.); and Circuitry to prevent cross-conduction from the high-side switch through the low-side switch directly to common under the undesirable condition where the on-time of the high-side switch overlaps the on-time of the low-side switch.

Accordingly, it would be advantageous to provide an integrated circuit control that can control more than one high-side phased switch feeding a single inductor. Conversely, the existing so-called "multiphase" controllers require that a separate inductor be used for each phase, which is costly and usually not economic to implement except for very high current applications. It is therefore to such inventive integrated circuit control that the present invention is directed.

SUMMARY OF THE INVENTION

The present invention discloses an integrated circuit controller that controls at least two high-side switches in converters with forced current sharing accomplished by phasing the duty cycles of the switches. In an alternate embodiment of the present invention, the integrated circuit controller controls at least two phased low-side switches in a power converter. In yet another alternate embodiment of the present invention, the integrated circuit controller controls at least two high-side phased switches and at least two low-side phased switches in a power converter. The high or low-side switches are controlled so that each switch turns on for only a fraction of the effective duty cycle under steady state load conditions. For example, if under a certain operating condition, an effective overall duty cycle of 50% is required, each switch of the two paralleled phased switches, high-side or low-side, will only turn on at a 25% duty cycle. Therefore each separate switch will run at a lower stress and will run cooler if all other parameters are equal. Because each switch runs cooler, its on-resistance will be lower and the converter will have less internal loss and therefore higher efficiency. Alternatively, higher resistance switches could be used at a lower cost for the same overall efficiency.

In one embodiment, the integrated circuit controller is capable of driving both phased switches on at the same time for effective duty cycles of up to and including 100% in the event of emergency power demand or a heavy load transient, and then can return to the phased switch operation under normal steady state operation of the converter. For example, if a computer is suddenly forced to operate at a maximum data rate, its power demand may require emergency mode duty cycle from the source or on-board power converter in order to supply the increased power demand.

Inanother embodiment, the integrated circuit controller is capable of sustaining stable control of a converter with only one inductor output filter section even though two or more phased switches are controlled and forced to share current feeding into the inductor. This is because the phased switches are paralleled to act as one switch but forced to share current as required by load changes that require fast changes in duty cycle.

In accordance with other aspects of the invention, a number of different control schemes can be incorporated in the controller, such as voltage mode control, hysteretic control, average current mode, peak current mode, or v-squared control. This is because the method for controlling the paralleled phased switches works at the basic PWM modulation level of the error signal and does not otherwise depend on the exact detail control method Preferably, even though high-side and/or low-side switches are phased, a low-side switch is prevented from being turned on during any time period when a high-side switch is turned on in order to prevent current cross-conduction from the power rail directly to common. Further, drive turn-on signal edges have appropriate delay circuits to prevent cross-conduction.

In a further embodiment of the invention, special PWM ramp signals are created that allow phasing of switches. Two clock signals are derived from a single source clock and drive the phased ramps. Other types of converters (other than buck converters) may be controlled with an alternate embodiment of the invention.

Other object, features, and advantages of the present invention will become apparent after review of the hereinafter set forth Brief Description of the Drawings, Detailed Description of the Invention, and the claims.

DETAIL DESCRIPTION OF THE INVENTION

Figure 1:
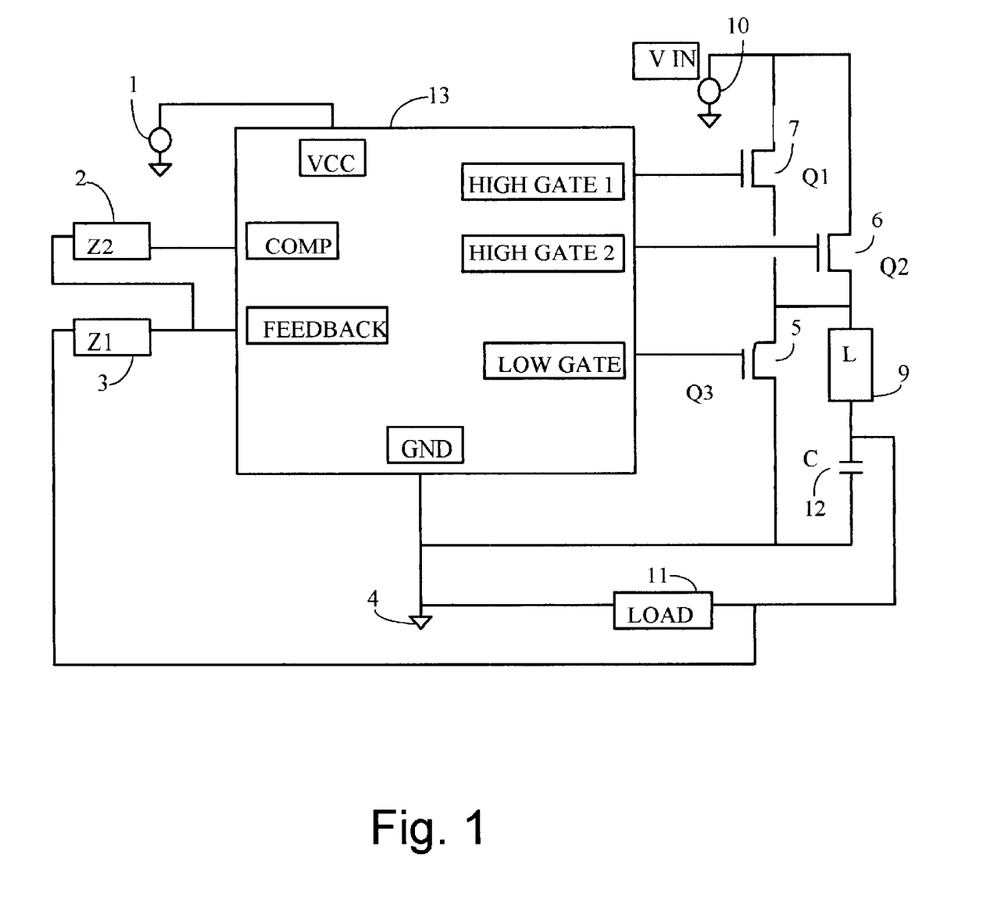
FIG. 1 is a block diagram of a buck power converter with the integrated circuit parallel phased switch controller invention incorporated therein.

Referring now in more detail to the drawings in which like numerals refer to like parts throughout the several figures, FIG. 1 shows a simplified block diagram of a complete power conversion device commonly known as buck converter that will be used in this description as an example, although the principles of the present invention are applicable to other types of power converters. A buck converter efficiently converts an input voltage to a lower output voltage using fast switching elements so that minimum power is dissipated in the conversion process. Additional information on buck converters can be obtained from U.S. Pat. No. 6,184,666 B2, titled "Buck Converter with Parallel Switches," issued on Feb. 6, 2001.

FIG. 1 shows a new type of buck converter where the high-side switching elements Q1, 7 and Q2, 6 are paralleled and driven in a phased switching control method by the integrated circuit controller 13 as the main object of this invention. An alternate preferred embodiment of the invention is to make the parallel phased switches the low-side equivalent switch instead of the high-side. Another alternate preferred embodiment of the invention is to use paralleled phased switches for both the high-side switches and the low-side switches. Further, more than two paralleled switches can be used for either high-side switching or low-side switching, or both, with other alternate preferred embodiments of the invention. The application of these alternate embodiments depends on the type of conversion to be performed, the input voltage and power, and the output power and voltage required. For the sake of simplicity, the following description will be limited to a device for controlling two parallel phased high-side switches and a single low-side switch as shown in FIG. 1. Once the basic method is described, it will be obvious how the other alternate embodiments can be implemented using the same methods with minor changes to the topology of the invention.

In another embodiment of the invention, the switching elements Q1, Q2, and Q3, (7, 6, and 5) of FIG. 1, could be included inside an integrated circuit controller for lower power applications. The basic control method according to the present invention for the parallel phased switch buck controller does not depend on any specific general control method. The control method described herein could be used with a large class of different control methods, such as voltage mode control, hysteretic control, peak current mode control, averaged current control, or the so-called "v-squared" control method. For simplicity, the following will describe the invention's application in the general class of voltage mode control using classical pulse width modulation technique with modifications or improvements as described herein by this invention, and such description is not intended to limit this invention to the described embodiments. It is important to note that a large number of alternate embodiments of the invention exist due to the various combinations of parallel high or low-side switches and the combinations of control methods and type of converters that can be used with the controller, i.e., various control methods, voltage mode, hysteretic mode, current mode, average current mode, or v-squared mode with the different types of converters, buck, boost, forward, flyback, Cuk', bridge, resonant, and quasi-resonant.

Referring again to FIG. 1, the controller 13 has a number of inputs and outputs which include but are not limited to a VCC source 1, a compensation input from Z2, 2, a feedback input from Z1, 3, a common or "ground" input 4, a power source V IN 10, a high gate number 1 drive out to a high side switch Q1, 7, a high gate number 2 drive to another high side switch Q2, 6, and a low gate drive to a low side switch Q3, 5. Not shown but also included, depending on the specific alternate embodiment of the invention, are additional inputs and outputs, such as a boost pin, which boosts the gate drive voltage sufficiently above the power rail voltage to turn on the high side switches 6 and 7, and connectors for other protective functions, such as fast-feedback, slow start-up, over-voltage, and over-current protection features.

Referring again to FIG. 1, the elements that are usually external to the controller 13 are the power sources 1 and 10, the compensation elements 2 and 3, the inductor 9, the filter capacitor 12, and of course the load 11. Elements 2, 3, 5, 6, and 7 could be included within the controller 13.

Figure 2:
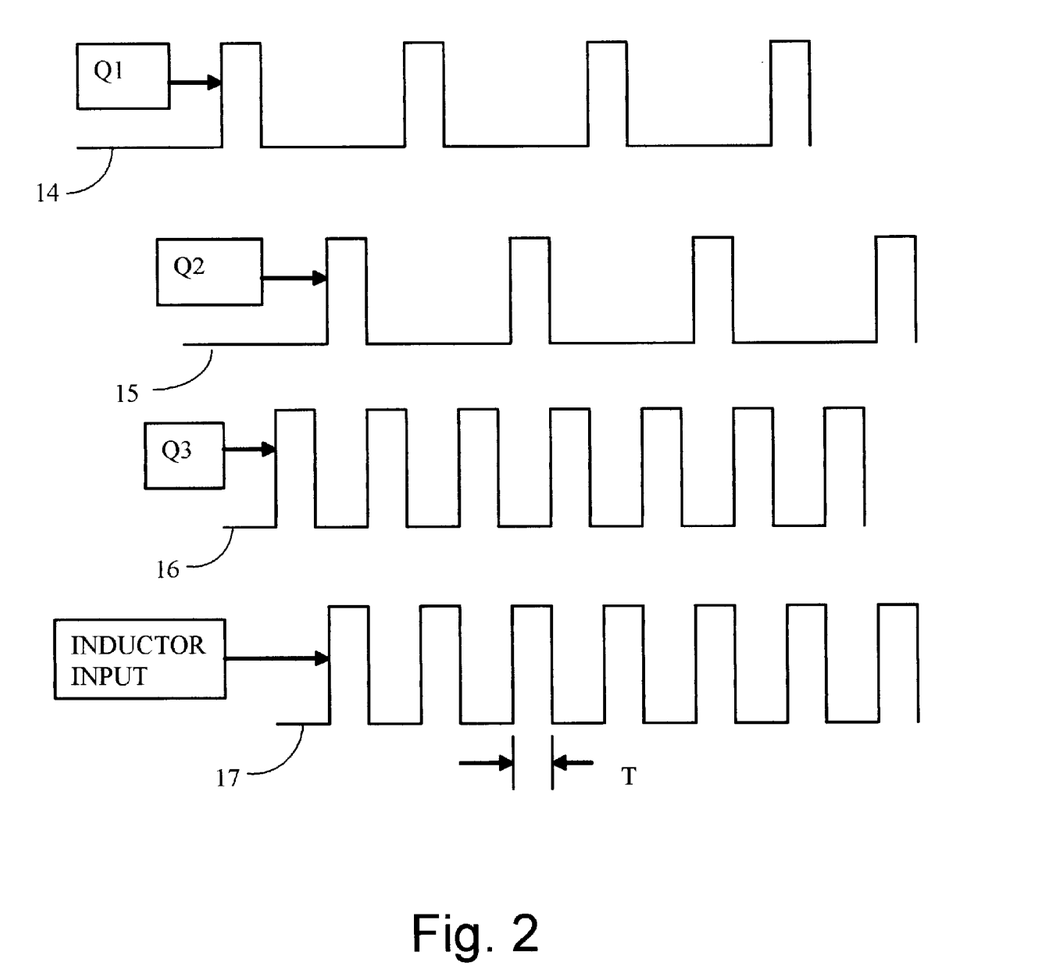
FIG. 2 depicts the relative switch drive signal phasing and the resultant converter chopper signal input to the filter inductor of FIG. 1.

Referring now to FIG. 2, the waveforms generated by the controller 13 are as follows:

1) Waveform 14 is a typical gate drive signal for the transistor Q1 of FIG. 1.
2) Waveform 15 is a typical gate drive signal for the transistor Q2 of FIG. 1.
3) Waveform 16 is a typical gate drive signal for the transistor Q3 of FIG. 1.

Note that as a part of the preferred embodiment, the waveforms 14 and 15 are normally phased to be high or "on" at different times corresponding to driving the on-state conditions of Q1 and Q2. Therefore, the signals 14 and 15 facilitate the operation of the parallel phased switch converter where normally each high side switch is on only ½ of the equivalent duty cycle. The width of the on-state pulses depends on the power demand of the load 11. However, as it is shown below, the this embodiment also allows Q1 and Q2 to be on simultaneously up to 100% duty cycle at times when emergency or full maximum power output is needed.

Waveform 17 of FIG. 2 is the resulting waveform developed at the external inductor input L 9, and "T" represents the "on-time" of a high-side switch. As far as the circuit external to the controller 13 is concerned, the system operates as a normal buck converter with a pulse width modulated signal (PWM signal) of up to 100% duty cycle driving the inductor.

Figure 3:
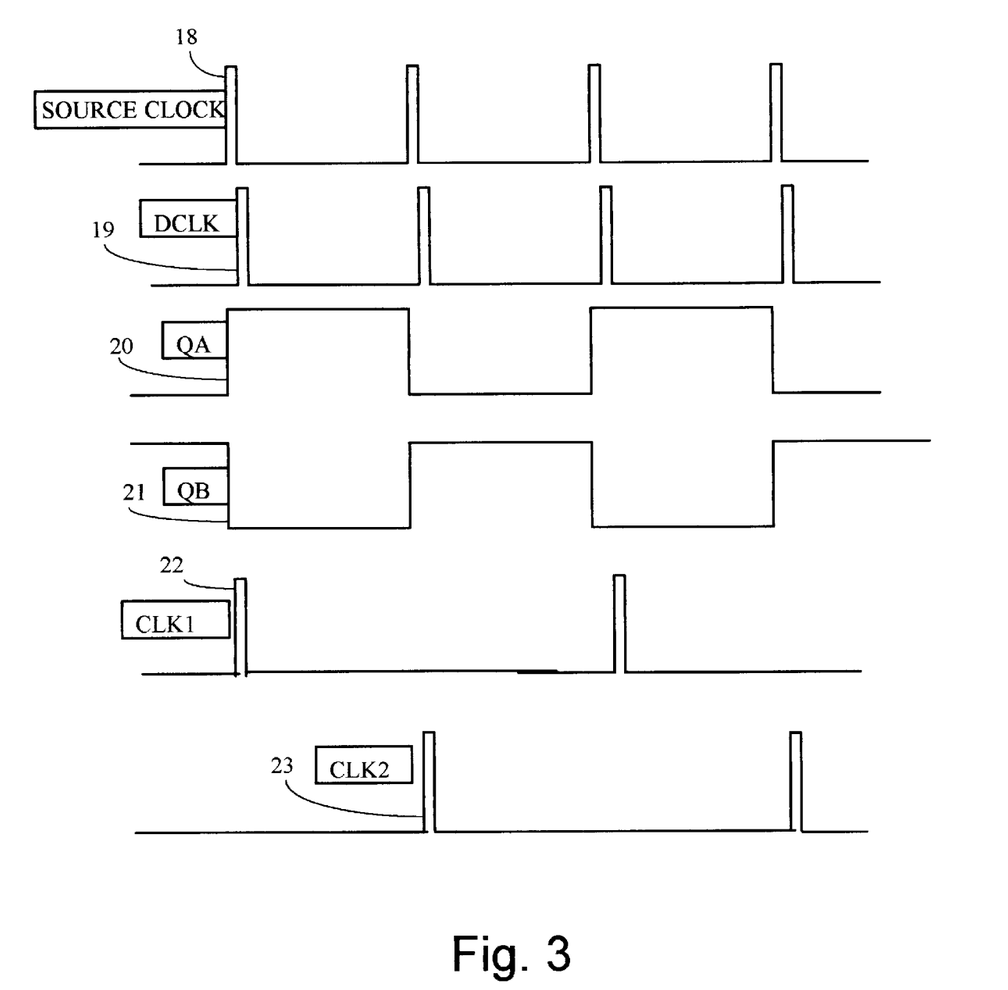
FIG. 3 depicts clock waveforms derived from a source clock.
Figure 4:
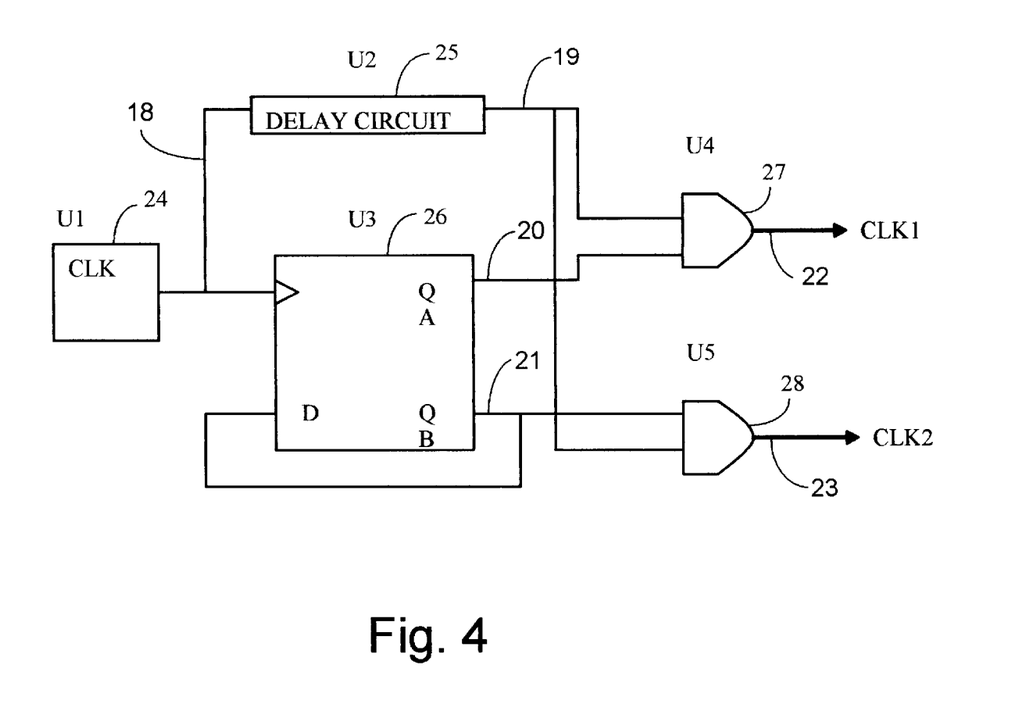
FIG. 4 depicts a simplified schematic of a circuit that provides two alternating phased clock pulses from a source clock.

Referring now to FIG. 3 and 4, FIG. 4 depicts a phased signal unit and FIG. 3 is a timing diagram for signals in this phased signal unit. The phased signal unit shows the generation of necessary phased drive clock signals from an on-board source clock 24 or from an external clock. The source clock waveform 18 is processed through a delay circuit 25 to produce the "DCLK" delayed clock signal 19. A flip-flop 26 is triggered by the rising edge of the source clock 24 to the high state and reset low by the next rising edge of the source clock 24, thus producing the "QA" waveform 20. The other output of the flip-flop 26, "QB", signal 21, is the inversion of QA signal 20. The delayed DCLK, signal 19, is and-gated (see FIG. 4, 27) with QA, 20, to produce a phased clock signal CLK1 22. Likewise the DCLK signal 19 is and-gated (see FIG. 4, 28) with the QB signal 21 to produce another phased clock signal CLK2 23. Note that in FIG. 4 the QB output 21 of the flip-flop 26 is fed back to the "D" input of the flip-flop 26 so that the flip-flop state is held at its previous state until the next rising edge of the source clock 24.

Figure 5:
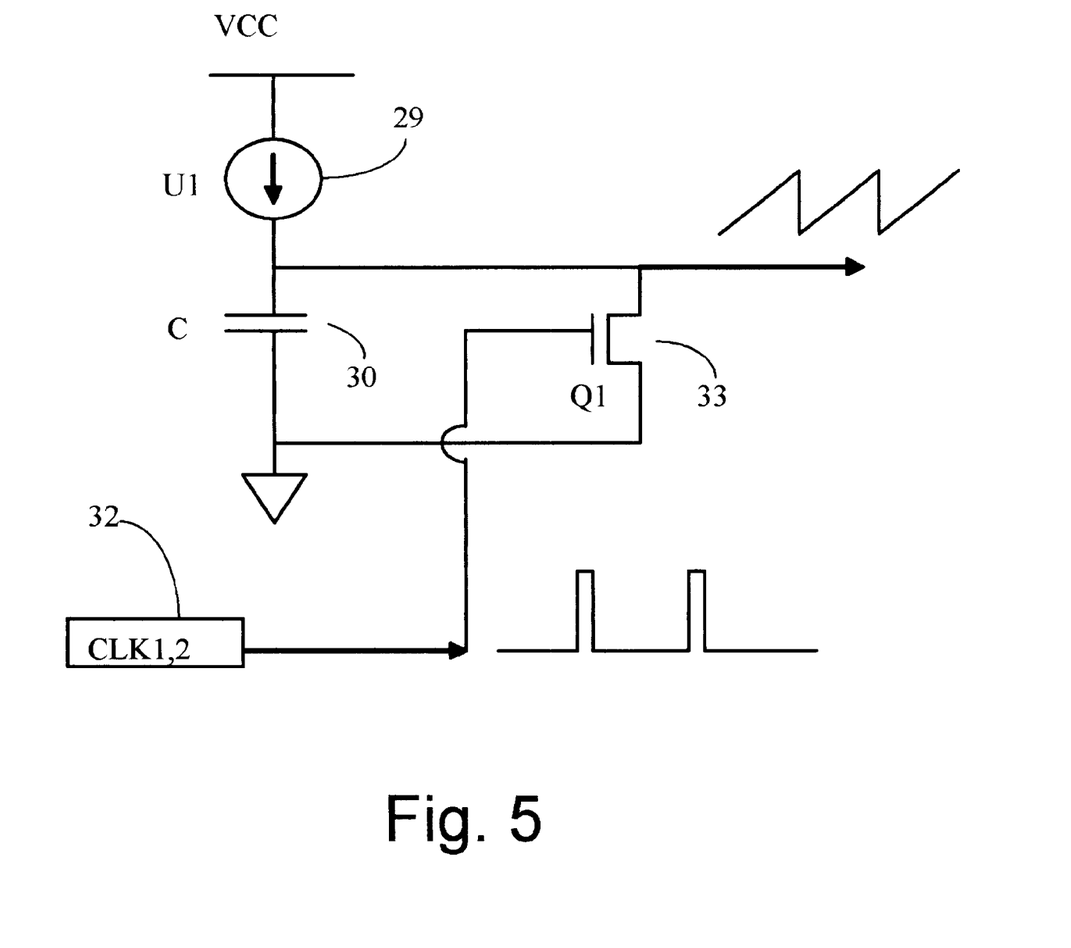
FIG. 5 depicts one of many circuits that can be used to generate the basic first ramp signals.

Referring now to FIG. 5, it is shown a ramp signal unit for generating a ramp oscillation signal. A constant current source U1, 29, charges the capacitor C, 30, until a clock pulse arrives from the clock generator circuit (see FIG. 3 and 4) that turns on Q1, 33, that discharges the capacitor 30. Once discharged, the capacitor 30 again charges until the next clock pulse arrives to discharge it again thus generating a ramp signal. One ramp signal is generated for each phased clock signal by one circuit of FIG. 5, and two circuits of FIG. 5 are needed to generate two ramp signals. The two ramp signals are phased 180 degrees from each other and synchronized by the clock signals. The ramp signals generated by the circuit of FIG. 5 are further processed as described next in FIG. 6.

Figure 6:
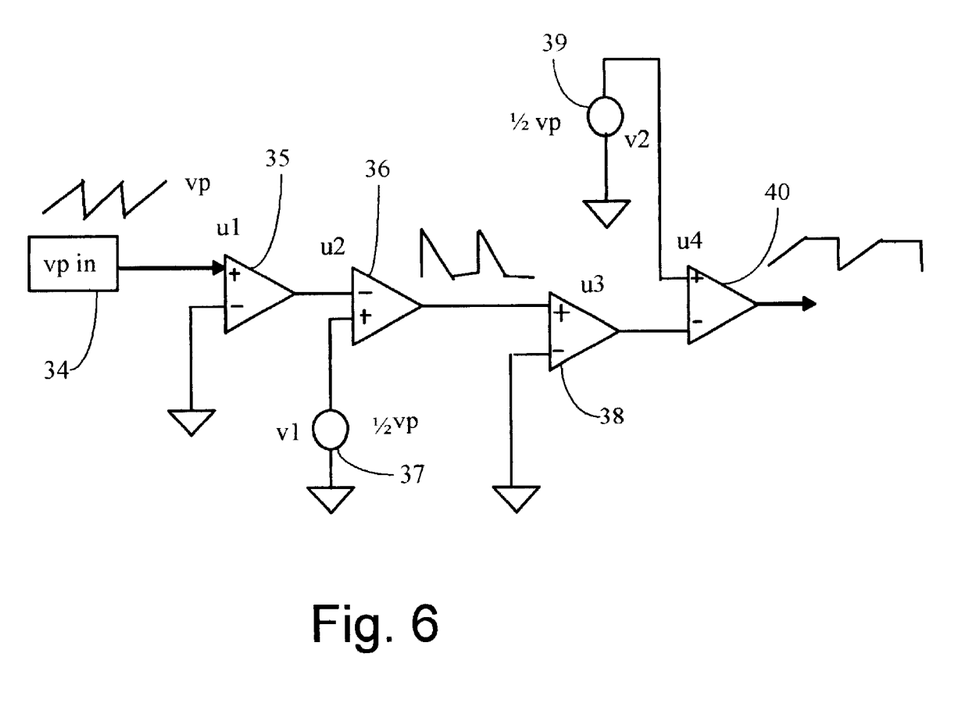
FIG. 6 depicts an exemplary circuit for converting a basic first ramp signal from a ramp generation circuit into a second ramp signal with a constant voltage level for ½ of its period.

Referring now to FIG. 6, it is shown a PWM unit for processing a basic first ramp signal into a second ramp signal that is ½ of the amplitude of the original first ramp signal and has a constant voltage level for ½ of the period of the ramp time period. Again, two ramp signals are required and that they are phased at 180 degrees to each other and synchronized to the original clock signals. In FIG. 6, the first ramp signal 34 is input to a positive terminal of a unity gain buffer amplifier 35. The output of the amplifier 35 is input to a negative input of another unity gain amplifier 36 where the signal is compared to a reference 37 that is ½ of the peak amplitude of the first ramp signal 34 and the signal is inverted at the output of this amplifier 36. Next, the signal from amplifier 36 is buffered by a unity gain amplifier 38 and then input to a negative terminal of a unity gain amplifier 40 where the signal is again compared to another reference 39 (same level as the reference 37) and inverted again to form the final second ramp signal at the output of amplifier 40. Again, two of these special ramps signals are required, each phased at 180 degrees to the other. The second ramp signals allow two modes of operation of the controller as described next.

Figure 7:
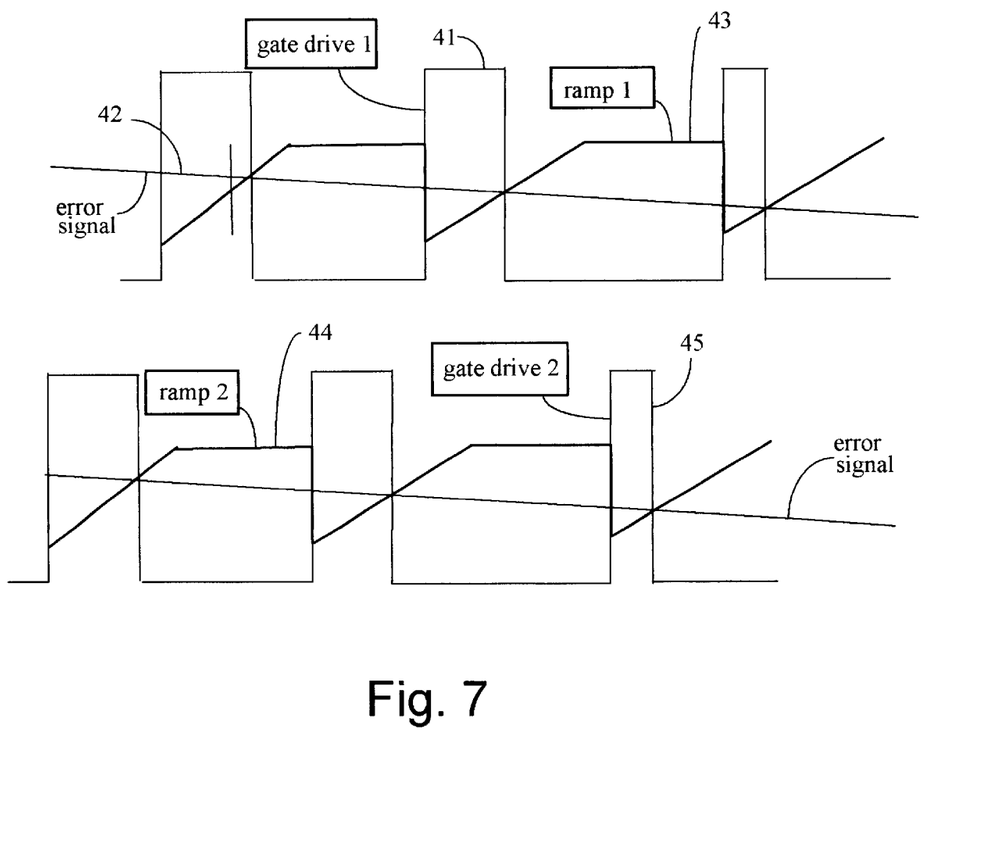
FIG. 7 depicts generation of PWM (pulse-width-modulated) signals from phasing of second ramp signals and comparing to an error signal.

Referring now to FIG. 7, the two second ramp signals 43, 44 are shown phased at 180 degrees with each other and synchronized with the source clock. The system error signal 42 is also shown compared in level to the two ramp signals. Note that the error signal 42 will in general change level with time. When the error signal is in the range of the ramp 43, 44, that has the rising edge, the comparison of the two signals 42 with 43, 44 will produce switch gate drive signals 41, 45 that result in a maximum duty cycle of 50% for each of the parallel phased switches (see FIG. 8 Q1 and Q3). If the error signal 42 is above the constant voltage portion of the second ramp signals 43, 44 then the system is in the emergency power demand state and both the parallel switches are at 100% duty cycle (see FIG. 8, Q1, Q3). Thus, with the special ramp signals two different states of operation are possible: (1) normal power range operation and (2) emergency power demand operation. This arrangement, whereby the error signal 42 is compared with the second ramp signals 43 and 44, generates the gate drive signals 41, 45 in two different states.

Figure 8:
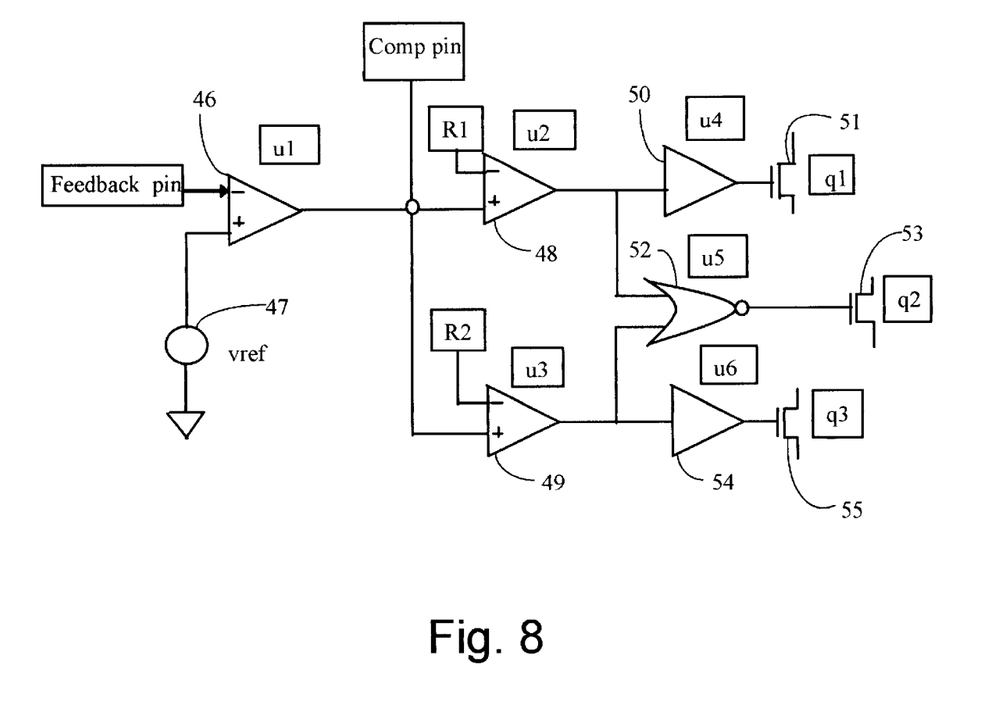
FIG. 8 depicts a simplified circuit diagram for generating raw (un-delayed) PWM signals for the high-sides and low-side switches.

Referring now to FIG. 8, it is shown a circuit for developing parallel phased gate drive signals and a complimentary gate drive signal. The exemplary circuit is for parallel high-side switches and a single low-side switch. The same circuit with a change in the polarity of the error signal can be used to drive a single high-side switch and parallel low-side switches. The same principles of this circuit can be used to create a drive for two sets of parallel switches, one set for high-side and one set for low-side. The circuit shown in FIG. 8 is simplified and does not show the anti-cross-conduction circuits as will be described below (Ref FIGS. 9, 10 and 11).

In FIG. 8, the error amplifier 46 compares the feedback voltage to a reference 47 and sends this signal to two PWM comparator amplifiers 48 and 49, which compare the error signal to the two second ramp signals R1 and R2 (ref FIG. 7.). The output of amplifier 46 (the "error signal") also connects to the external compensation pin (identified as "comp pin" in FIG. 8.). Comparator amplifiers 48, 49 compare the error signal to the two second ramps R1 and R2 (ref FIG. 7). The PWM phased gate drive signals from comparator amplifiers 48 and 49 are input to the two final drive buffers 50 and 54, which drive the parallel phased switches Q1, Q3, 51 and 55. The outputs of comparators 48 and 49 are also input to a NOR gate 52 that outputs a drive signal for Q2, 53, whenever the two drive signals from the comparators 48 and 49 are low. Therefore, Q2, 53, is only on when Q1, 51, and Q3, 55, are off Additional circuitry, not shown in FIG. 8, prevents any cross-conduction from occurring (see FIGS. 9, 10, 11.)

Figure 9:
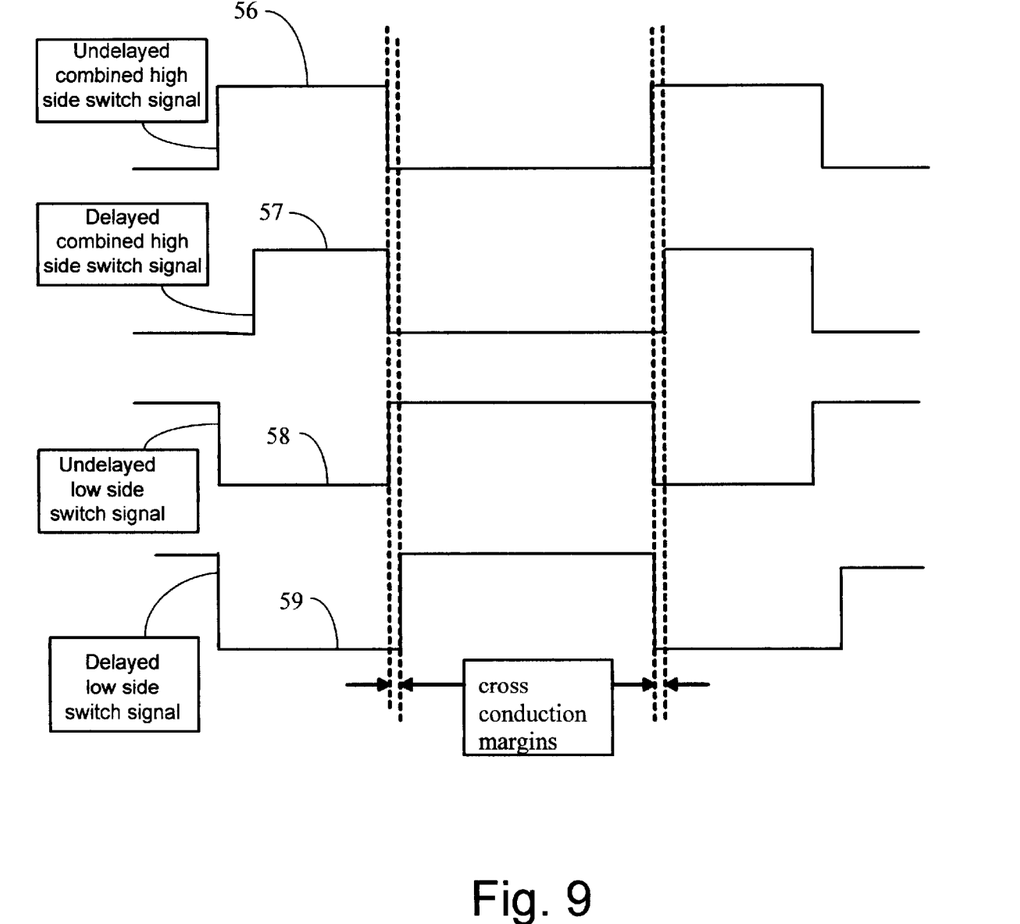
FIG. 9 depicts a timing diagram of delayed signal rising edges that prevent cross-conduction between high side and low side switches.

FIG. 9 illustrates a timing diagram of delayed signal rising edges for preventing cross-conduction between high side and low side switches. If both a high side switch and a low side switch are turned on at the same time, there is a short circuit from the source power rail to common. This condition is known as cross-conduction condition. Signal 56 represents the combined equivalent PWM parallel high-side switch logical drive (the original un-delayed drive signals). Signal 58 represents the original (un-delayed) logical signal for the low-side gate drive. Signals 56 and 58 have their rising edges delayed but not their falling edges to produce signals 57 and 59 which are the final gate drive signals for the switches. By delaying only the rising edges of the original logical drive signals and maintaining source clock synchronization as well as the 180 degree phasing with the NOR gate 52 logic of FIG. 8, cross-conduction is eliminated because the low-side switch is never turned on when any high-side switch is turned on. Also, neither high-side switch is turned on before the low-side switch is turned off Refer to FIG. 10 for the block diagram of the circuit to accomplish this process.

Figure 10:
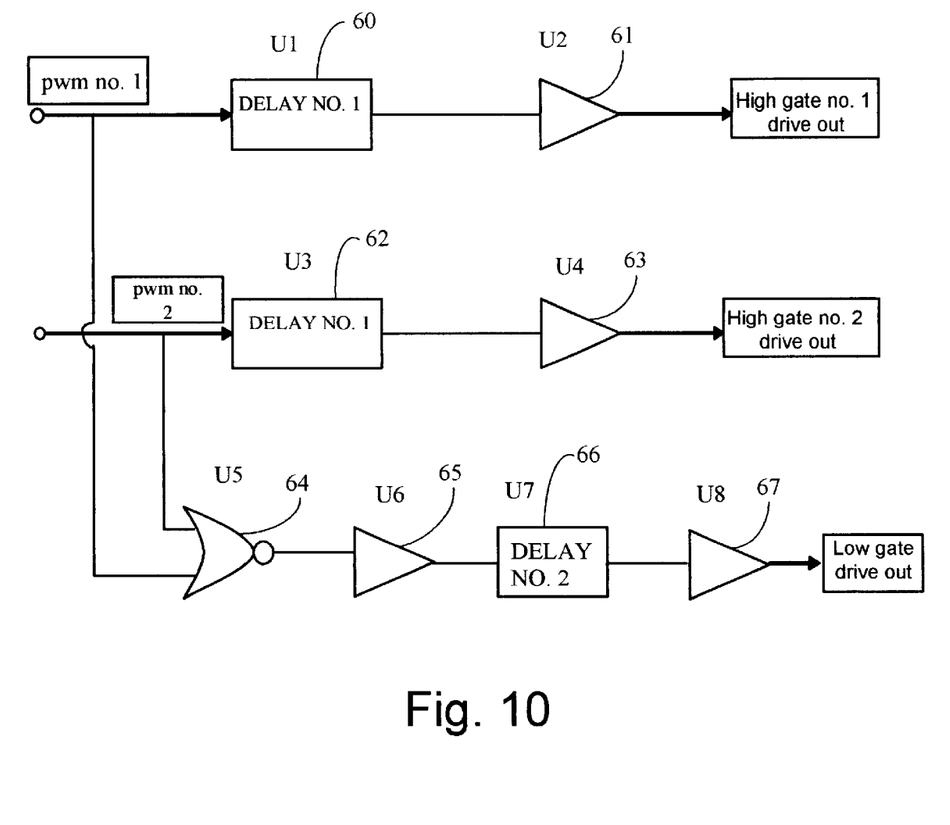
FIG. 10 illustrates an exemplary block diagram for delaying PWM signals.

Referring now to FIG. 10, a simplified block diagram of the anti-cross-conduction delay system is shown. PWM signals no. 1 and no. 2 both have rising edges delayed by delay circuit U1, 60, and U3, 62, with identical time delay values for the rising edges of the signals. U2, 61, and U4, 63, are the final gate drive buffers for the high-side switches. The logical PWM signals are also fed into a NOR gate U5, 64 and a buffer U6, 65. The output of the buffer U6, 65, goes to the delay circuit U7, 66, which has a slightly longer delay for the rising edge than the PWM signals no. 1 and no. 2 had. U8 is the final drive buffer for the low-side gate drive. Buffers U2, 61, U4, 63, and U8, 67, are all of identical design and having the same signal delays, so the delays of the final gate drive signals are correct relative to each other to prevent any cross-conduction.

Figure 11:
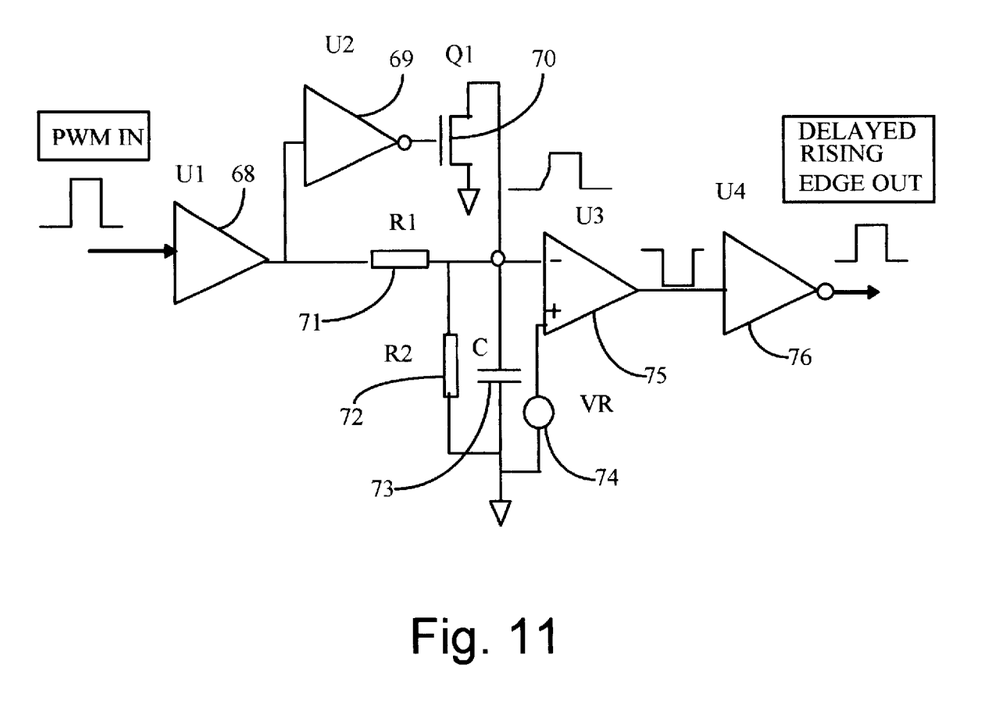
FIG. 11 illustrates an exemplary delay circuit that produces a delay of the rising edge of a gate drive signal but the falling edges are not significantly delayed.

FIG. 11 is a simplified schematic of a delay unit in FIG. 10. The logical original PWM high-side signal or the low-side signal from the NOR gate 64 of FIG. 10 is processed first by the buffer U1, 68. The output of U1, 68, is fed to the resistor R1, 71, and to the inverter U2, 69. The resistor RI, 71, connects to another resistor R2, 72, a capacitor C, 73, the drain of transistor Q1, 70, and to the negative input of the comparator U3, 75. A reference VR, 74, of approximately ½ or less of the peak voltage developed from the output of U1, 68, is connected to the positive input of the comparator U3, 75. The output of U2, 69, goes to the gate of a small n-channel mosfet, Q1, 70, inside the integrated circuit. The source of the mosfet 70 is connected to common and the drain is connected to the negative input of the comparator 75. The output of the comparator 75 is connected to an inverter U4, 76. The final rising edge delayed signal is output from the inverter 76. R2, 72, is greater than RI, 71, so that when the capacitor C, 73, is charged to a specified voltage, the voltage will be sufficient to trip the comparator 75 to its low state with the reference 74 at the specified level. The delay is determined by the RC time constant of the circuit and the setting of the reference 74 relative to the ratio of R1/R2. The mosfet 70 is in the off-state during the time the capacitor is charging up. Then the mosfet 70 turns on as soon as the output of U2, 69 goes high in accordance with the original PWM logical signal going low at the output of the buffer U1, 68. Therefore, the capacitor C, 73, is discharged quickly through Q1, 70, causing very small or approximately zero delay for the falling edge of the PWM signal.

The same circuit is used to delay the rising edge of the low-side gate drive signal except the delay is set to be slightly longer. In this case the logical low-side gate drive signal is input to buffer U1, 68, and the delay operation of the circuit is the same as for the PWM signals.

In an alternate embodiment, the inverter U2, 69, and the mosfet Q1, 70 can be eliminated from the circuit if a longer delay in the falling edge can be tolerated. The rising edge will still be delayed considerably more than the falling edge because of the arrangement of the resistors R1, 71, and R2, 72, and the active high and low output signals of buffer 68.

Figure 12:
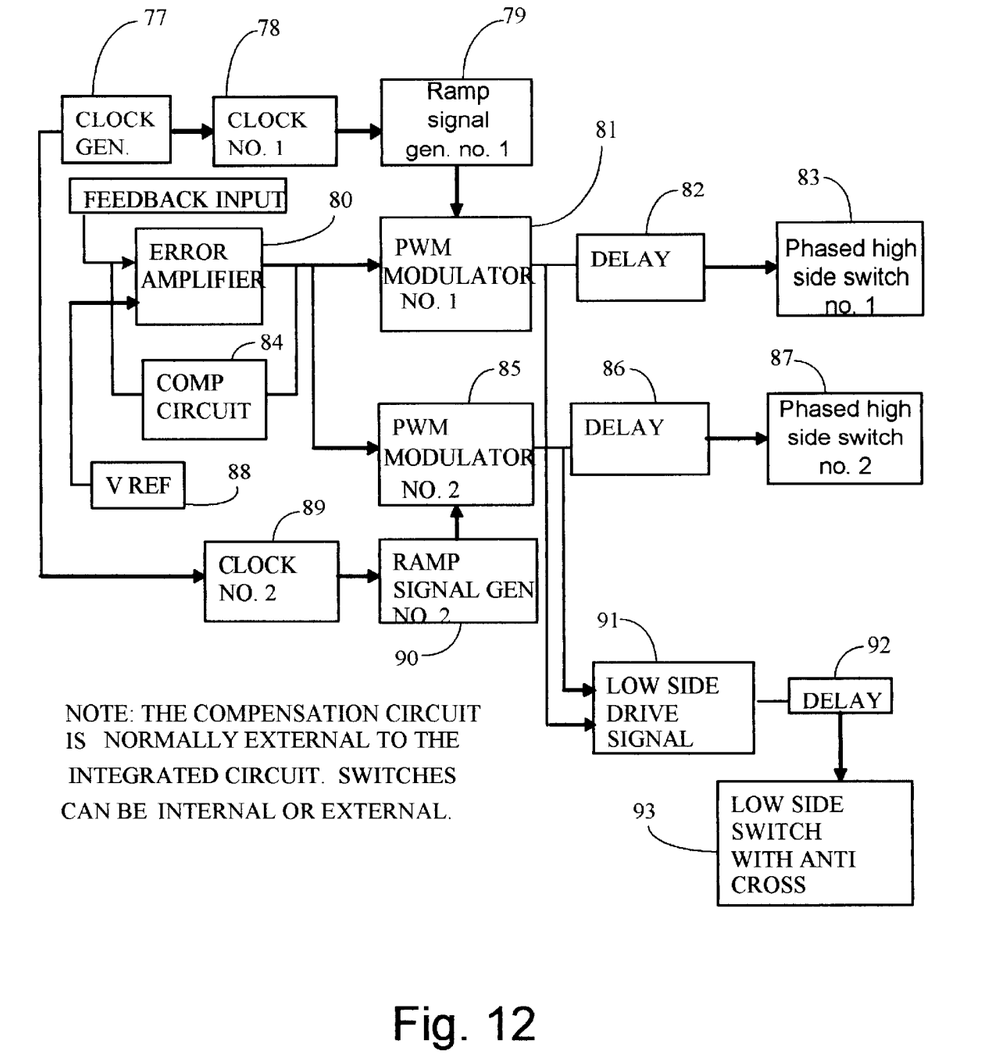
FIG. 12 depicts a block diagram of a paralleled phased switch controller integrated circuit.

FIG. 12 is a simplified block diagram of a paralleled phased switch controller integrated circuit according to the present invention. A single clock generator 77 generates phased clocks 78 and 89. The special ramp signals 79 and 90 are derived from the clock signals. The external converter system feedback signal is processed through an error amplifier 80 and fed to PWM modulators 81 and 85. The error amplifier 80 has an external compensation network 84 and an internal or external reference 88. In an alternate embodiment the reference is externally programmed by a DAC (digital-to-analog converter) or set to a specific value by an internal reference, for example a band-gap reference. The PWM modulators 81, and 85, have their output pulse rising edges delayed by the delay circuits 82 and 86. The delayed signals are then fed to the parallel phased high-side switches 83 and 87. A NOR gate provides the low-side drive signal 91 which is fed through the delay circuit 92 that delays the rising edge of the pulses and provides the low-side switch anti-cross-conduction protection 93.

The simplified schematics of each major function shown in FIG. 12 can be found by reviewing the other figures discussed above. Those skilled in the art would appreciate variations that can be applied to the embodiments described above without departing from the spirit of the invention.

Some alternate embodiments with minor modifications of the above-described embodiments would be generally described as the following:

(1) An integrated circuit to control two parallel phased high-side switches and two parallel phased low side switches with similar embodiments as described above.

(2) An integrated circuit to control a single high-side switch with parallel phased low-side switches.

(3) An integrated circuit to control more than two parallel phased high and/or low-side switches; for example three high-side switches and two low-side switches, etc. In this embodiment, each switch would be phased so that usually no more than one of the parallel switches would be on at the same time. This embodiment would be especially useful in high power applications where only a single filter inductor is required.

(4) Integrated circuits for control of other types of power conversion circuits where parallel phased switches could be used, including but not necessarily limited to, flyback converters, forward converters, Cuk' converters, push-pull converters, boost converters, inverters, full-bridge converters, half-bridge converters, resonant power converters, and quasi-resonant power converters.

It should be noted that many of the individual elements shown in FIGS. 1 through 12 could be eliminated or combined with other elements as would be apparent to one or skill in the art.

Although various exemplary embodiments of the invention have been disclosed, it should be apparent to those skilled in the art that various changes and modifications can be made that will achieve some of the advantages of the invention without departing from the scope of the invention.

What is claimed is:

1. A controller for controlling high side and low side switches in a power converter that operates in a high frequency switching mode, the controller comprising:

a plurality of phased clock units, each phased clock unit receiving a clock signal from a clock source and generating a phased clock signal;

a plurality of ramp signal units, each ramp signal unit receiving a phased clock signal from the phased clock generation unit and generating a first ramp signal;

a plurality of pulse width modulation units, each pulse width modulation unit receiving a first ramp signal from a ramp signal unit and generating a second ramp signal having a reduced amplitude; and a parallel gate drive unit, the parallel gate drive unit receiving second ramp signals and comparing the second ramp signals with an error signal, the parallel gate drive unit generating at least one parallel phased gate drive signal and at least one complimentary phased gate drive signal.

2. The controller of claim 1, wherein number of phased clock units are two.

3. The controller of claim 2, wherein two phased clock signals generated being phased 180 degrees from each other.

4. The controller of claim 2, wherein each phased clock unit further comprises a delay circuit, the delay circuit selectively generating a delay clock signal.

5. The controller of claim 4, wherein each phased clock unit further comprises a flip-flop.

6. The controller of claim 1, wherein the second ramp signal has a reduced voltage level for half of a period.

7. The controller of claim 1, further comprising a delay unit, the delay unit receiving a phased gate drive signal and generating a rising edge delayed signal.

8. The controller of claim 7, wherein the delay unit receiving a parallel phased gate drive signal and generating a rising edge delayed parallel phased gate drive signal.

9. The controller of claim 8, wherein the delay unit receiving a complimentary phased gate drive signal and generating a rising edge delayed complimentary phased gate drive signal.

10. The controller of claim 9, wherein the rising edge delayed parallel phased gate drive signal and the rising edge delayed complimentary phased gate drive signal do not overlap.

11. The controller of claim 1, wherein the parallel gate drive unit generates two parallel phased gate drive signals and one complimentary phased gate drive signal.

12. The controller of claim 11, wherein a parallel phased gate drive signal drives a high side switch and a complimentary phased gate drive signal drives a low side switch.

13. The controller of claim 1, wherein the parallel gate drive unit generates one parallel phased gate drive signal and two complimentary phased gate drive signals.

14. The controller of claim 1, wherein the parallel gate drive unit generates one parallel phased gate drive signal and one complimentary phased gate drive signal.

15. A method for controlling high side and low side switches in a power converter that operates in a high frequency switching mode, the method comprising the steps of:

providing a source clock signal;

deriving a plurality of phased clock signals from the source clock signal;

generating a first ramp signal for each phased clock signal;

modulating a second ramp signal from the first ramp signal, wherein the second ramp signal having a reduced amplitude;

comparing the second ramp signal with an error signal; and generating phased gate drive signals, wherein the phased gate drive signals are used to control high side and low side switches.

16. The method of claim 15, wherein the step of generating phased gate drive signals further comprises the steps of:

generating two parallel phased gate drive signals; and generating one complimentary phased gate drive signal.

17. The method of claim 15, wherein the step of generating phased gate drive signals further comprises the steps of:

generating one phased gate drive signal; and generating two complimentary phased gate drive signals.

18. The method of claim 15, wherein the step of generating phased gate drive signals further comprises the steps of:

generating one phased gate drive signal; and generating one complimentary phased gate drive signal.

19. The method of claim 16, further comprising the step of delaying the rising edge of the complimentary phased gate drive signal.

20. The method of claim 16, further comprising the step of preventing cross-conduction of current by delaying the rising edge of the complimentary phased gate drive signal.

21. A voltage converter for reducing a high voltage, low current input to a low voltage, high current output, said voltage converter comprising:

a voltage source;

a plurality of parallel phased high side switches, each having a first end and a second end, wherein the first end of a high side switch being connected to the voltage source;

an inductor having a first end and second end, wherein the first end of the inductor being connected to a second end of a high side switch;

a low side switch having a first end and second end, wherein the first end of the low side switch being connected to the second end of a high side switch and the second end of the low side switch being connected to a ground;

a capacitor having an first end and second end, wherein the first end of the capacitor being connected to a second end of the inductor and a second end of the capacitor being connected to the ground; and a controller, the controller having a plurality of high side control points for controlling the plurality of parallel phased high side switches, the controller also having a low side control point for controlling the low side switch, wherein the plurality of parallel phased high side switches being on when the low side switch being off, and the high voltage, low current input from the voltage source being reduced to a low voltage, high current output that is available to a load connected between the first end of the capacitor and the ground.

* * * * *